July 22, 1969  G. A. TEICHMANN  3,456,450
APPARATUS FOR BURYING EXPLOSIVE CHARGES
Filed Jan. 30, 1967
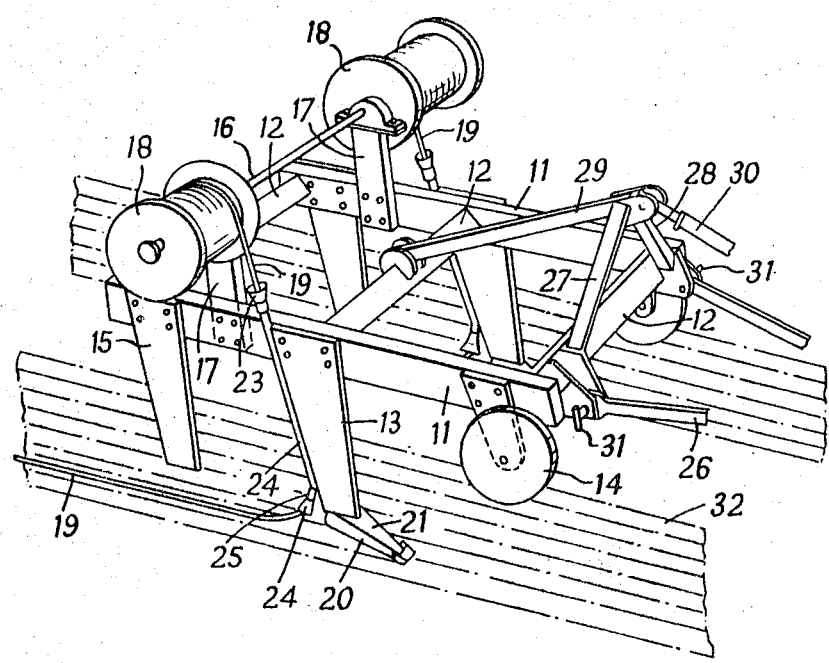
INVENTOR
GORDON ALGER TEICHMANN
By
Cushman, Darby & Cushman
ATTORNEYS 3,456,450
APPARATUS FOR BURYING EXPLOSIVE
CHARGES
Gordon Alger Teichmann, Colchester, England, assignor to Imperial Chemical Industries Limited, London, England, a corporation of Great Britain
Filed Jan. 30, 1967, Ser. No. 612,604
Claims priority, application Great Britain, Feb. 7, 1966, 5,279/66
Int. Cl. E02f 5/02; G01v 1/02
U.S. Cl. 61—72.6
13 Claims

ABSTRACT OF THE DISCLOSURE

A flexible cord-like explosive charge is buried in the ground for seismic exploration purposes by means of a machine which when moved along the ground plows a temporary opening in the ground, feeds the charge through a depending guide tube into the opening and covers the charge with earth. The lower end of the guide tube includes a flexible discharge portion to permit relative movement between the remainder of the tube and that portion of the charge around which earth has closed.

DISCLOSURE

This invention relates to a method for producing a seismic record of subterranean rock formations and to apparatus for use therein.

In seismic prospecting on land it has hitherto been the practice to position explosive charges at the bottom of drillholes and to record, on geophones or other detecting means, the seismic waves reflected or refracted at the rock layer interfaces when the charges are detonated. It has been proopsed to employ elongated continuous explosive charges running parallel to the surface of the ground but this method has not yet been used for large scale prospecting. Elongated charges are advantageous because there is improved energy coupling to the ground and the seismic waves generated in the longitudinal direction of the charge are much smaller than those from individual charges.

We have now found that an elongated charge of pentaerythritol tetranitrate (PETN) is especially well suited to the requirements of seismic prospecting because, it is believed, of its high velocity and high weight strength.

Thus in accordance with the invention, in a method of producing a seismic record of subterranean rock formations an elongated explosive charge comprising PETN is located adjacent to the surface of a prospect area and detonated, and the resulting seismic waves reflected or refracted from the rock layer interfaces are recorded. This method is applicable both to land and marine seismographic prospecting operations.

The explosive charge may advantageously contain up to 30% by weight of aluminum powder in admixture with PETN.

The charge is preferably formed as a cord or tape, the preferred charge being a detonating fuse cord having a core comprising granular PETN encased in a flexible waterproof envelope.

The charge is preferably buried underground. A cord or tape-like charge may advantageously be buried by means of an apparatus comprising a plough member adapted to penetrate and to be moved through the upper ground layer thereby to form a temporary opening in said layer, conduit means through which the charge may be fed in a continuous manner into said opening as the plough member is moved and earth-moving means arranged to stem said temporary opening by moving a portion of said ground layer into said opening to provide confinement during the detonation of said charge.

The plow member conveniently comprises a rigid elongated member adapted in operation to penetrate the ground in a generally upright manner and in this form of apparatus the conduit means is conveniently a passage formed in the plough member itself or it may be a tubular member attached thereto. The conduit means is preferably shaped to conform in cross-section to that of the explosive charge and may conveniently be a metal tube.

In a preferred form of apparatus the plow member is provided with pressure means to urge the end of the plow member downwards into the earth as it is moved forward. This may comprise a forward and downward inclined member formed on or attached to the plow member in such manner that it is, in operation, located below the surface of the earth. It may, for example, be in the form of a shoe member attached to the lower end of an upright elongated plow member to extend forward of the plow member.

The apparatus preferably comprises guide means to direct the cord or tape-like explosive charge smoothly into and through the conduit means. The guide means may advantageously comprise guide rollers but when the conduit means is a tubular member attached to the plow member, the guide means may be provided by shaping of the tubular member as, for example, by flaring the upper end and curving the lower end backwards. It is also advantageous for the lower end of the tubular member to be flared or to be resiliently attached to the remainder of the conduit means so as to avoid damaging the explosive charge by minor vertical or sideways displacement of the conduit means when in use.

The conduit means and guides are preferably constructed from nonferrous metals or alloys such as, for example, copper, brass or aluminium or from synthetic plastic materials such as, for example, polyethylene, polypropylene, polyvinyl chloride, polytetrafluoroethylene or nylon. These materials are advantageously used in the form of a lining or covering on a supporting structure of steel or other hard material.

The earth moving means of the apparatus may conveniently comprise a tine or disc arranged behind and slightly out of alignment with the plow member. It may also comprise one or more flexible members such as, for example, a chain, arranged to be pulled through the ground adjacent to the temporary opening so as to displace earth on either side of the opening into said opening.

The apparatus may advantageously comprise an earth cutter adapted to make a surface cut in the ground in advance of the plow member and this cutter is conveniently a disc cutter. The apparatus may also advantageously comprise storage means for the elongated explosive charge from which the charge may be withdrawn in a continuous manner as the apparatus is moved forward. Conveniently the elongated explosive is wound on a reel or drum which is mounted on the apparatus so as to rotate around its axis.

The plow member may, if desired, be adjustably mounted on a supporting structure so that the depth of its penetration into the ground may be adjusted. The penetration can, however, usually be adequately controlled by variation of the attitude of the supporting structure.

It is also desirable to mount the plow member, conduit means and storage means so as to avoid abrupt changes in direction of the feed path of the explosive charge.

Although positive feed means may be provided to move the explosive charge through the conduit means, such means are not generally necessary since, if the explosive is stored on freely rotatable reels, the frictional pull of the earth closing around the charge will pull the charge through the conduit means.

In operation the apparatus of the invention is conveniently mounted behind a tractor or other towing vehicle.

Further features of the invention are included in a preferred apparatus which will now be described, by way of example, with reference to the accompanying drawing which is a diagrammatical representation of the apparatus viewed in perspective showing the path of the explosive charge.

This apparatus is designed to bury two parallel strands of detonating fuse cord.

The apparatus has a supporting frame consisting of two longitudinal beams 11 joined by three lateral members 12. Each of the longitudinal beams 11 carries a plow member 13, an earth-cutting rotatable disc cutter 14 and an earth-moving tine 15, the tine 15 being positioned slightly out of alignment with the plow member. A shaft 16 is mounted by brackets 17 on the beams 11 and in operation this shaft carries storage reels 18 on which a supply of detonating fuse cord 19 is wound. A shoe 20 on the end of the plow member 13 has a downwardly inclined leading face 21 to provide downward pressure when the plow member is moved forward. A conduit tube 22, attached to the trailing edge of the plow member 13 is formed with a flared portion 23 at its upper end and carries at its lower end a flared metal end piece 24 attached by a rubber tube 25.

The apparatus is provided with conventional towing and lifting mechanism comprising towing members 26 and lifting members 27, 28 and 29 coupled to an arm 30 which is operated by lifting means on the towing vehicle. The members 26 are attached to the main frame through shear pins 31 designed to break when the plow member strikes an immovable object. Horizontal movements of the arm 30 rotate the apparatus frame around the shear pins 31 to raise and lower the plow member 13.

To bury the detonating fuse cord 19 in the ground the apparatus is towed forward and the plow member 13 is lowered to penetrate the ground 32 to the required depth and the fuse cord is fed through the conduit tube 22. As the plow member 13 is advanced a temporary opening is formed into which the fuse cord 19 is drawn. The tine 15 moving behind the plow member 13 displaces earth into the temporary opening to cover the fuse cord which is already laid and to grip the fuse cord sufficiently to draw the fuse cord continuously from the storage reel 18 as the apparatus is advanced. When the desired length of fuse cord 19 has been buried it is cut from the supply, an electric detonator is attached to the end and the plow member is advanced sufficiently to bury the end of the fuse cord and detonator, leaving the ends of the detonator leading wires on the surface. The plow member 13 is then raised from the ground and the wires drawn from the conduit tube 22 and end piece 24, and the detonator is ignited by attaching an electric energy source across the wires. When the detonator and the end of the fuse cord is buried in this manner there is no air blast caused by detonation of unstemmed explosive at the ground surface. The seismic waves generated by the detonation of the explosive are, after reflection or refraction from subterranean rock layer interfaces, received on geophones (not shown) positioned on the ground surface and recorded.

What I claim is:

1. In apparatus for burying a flexible elongated explosive charge for seismic prospecting, said apparatus including a plow member for penetrating, loosening and moving through the upper ground layer of a prospect area to thereby form a temporary opening in the layer and means defining a conduit through which the flexible charge passes so as to be guided downwardly to below ground level and into the opening formed by said plow whereby the loosened earth closes around the flexible charge upon issuance of the latter from the lower end of said conduit means, the improvement which comprises a tubular discharge portion through which the flexible charge passes, said portion being associated with the lower end of said conduit for preventing damage to the flexible charge upon minor vertical or sideways displacement of said conduit, said discharge portion being flexibly attached to the lower end of said conduit so as to be freely movable relative to said conduit in vertical and sideways directions to permit said conduit to move relative to that portion of the charge around which the loosened earth has closed whereby such movement of said conduit does not tend to overstress the flexible charge at the point of its issuance from said conduit.

2. Apparatus as in claim 1 wherein said tubular discharge portion terminates in a funnel-like flared end.

3. Apparatus as in claim 1 wherein said tubular discharge portion includes a rubber tube through which the flexible charge passes.

4. Apparatus as in claim 1 further including earth-moving means for stemming the temporary opening in the ground by moving a portion of the ground layer into the opening to provide increased confinement during detonation of the charge.

5. Apparatus as in claim 1 including an earth-displacing member arranged behind and slightly out of alignment with said plow member for displacing earth into the opening formed by said plow so as to bury the flexible charge.

6. Apparatus as claimed in claim 1 wherein the conduit means is shaped to confrom in cross-section to that of the explosive charge.

7. Apparatus as claimed in claim 1 wherein the plow member is provided with pressure means to urge the end of the plow member downwards as it is moved forward.

8. Apparatus as claimed in claim 7 wherein the pressure means comprises a forward and downward inclined member associated with the plow member so as, in operation, to be located below the surface of the earth.

9. Apparatus as claimed in claim 7 wherein the pressure means comprises a shoe member attached to the lower end of the plow member.

10. Apparatus as claimed in claim 1 including an earth cutter adapted to make a surface cut in advance of the plow member.

11. Apparatus as claimed in claim 10 wherein the cutter is a disc cutter.

12. Apparatus as claimed in claim 1 including storage means for the explosive charge.

13. Apparatus as claimed in claim 12 wherein the storage means comprises a roller mounted so as to rotate around its axis.

References Cited

UNITED STATES PATENTS

| 781,568 | 1/1905 | Stevens | 61—72.6 |
| 882,649 | 3/1908 | Noble | 61—72.6 |
| 2,377,903 | 6/1945 | Rieber. | |
| 2,812,731 | 11/1957 | Gardner | 61—72.6 |
| 3,170,300 | 2/1965 | Kelley | 61—72.6 |
| 3,308,628 | 3/1967 | Nichols | 61—72.6 |
| 3,339,369 | 9/1967 | Ryan | 61—72.6 |

FOREIGN PATENTS 207,353    3/1957    Australia.

EARL J. WITMER, Primary Examiner

U.S. Cl. X.R.

181—.5